UNITED STATES PATENT OFFICE.

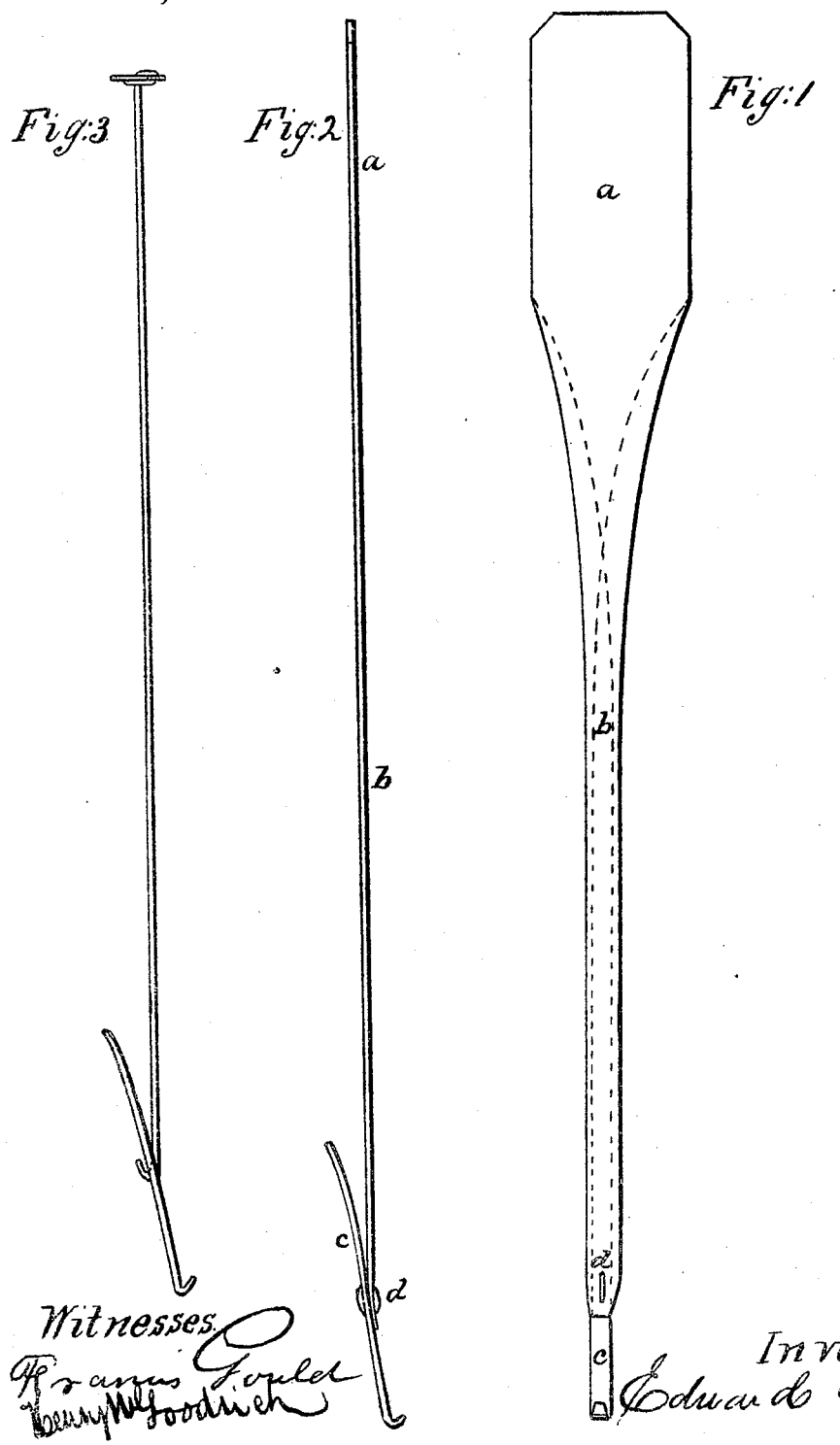

EDWARD A. LOCKE, OF BOSTON, MASSACHUSETTS.

TAG FOR COTTON-BALES.

Specification forming part of Letters Patent No. 42,860, dated May 24, 1864.

*To all whom it may concern:*

Be it known that I, EDWARD A. LOCKE, of Boston, in the county of Suffolk and State of Massachusetts, have invented an Improvement in Tags for Cotton-Bales; and I do hereby declare that the following, taken in connection with the drawings which accompany and form part of this specification, is a description of my invention sufficient to enable those skilled in the art to practice it.

Letters Patent of the United States, dated April 28, 1863, and numbered 38,365, were issued for the invention of H. W. Goodrich and myself for a device for tagging or marking cotton-bales, and similar Letters Patent No. 40,109 were also granted, on the 29th of September, 1863, for my invention of certain improvements upon the aforesaid patent.

My present invention may be classed as an improvement upon both the aforesaid patents, in that I construct the holding device or anchor, which is extended into and remains within the bale, of horn, wood, hard rubber, copper, brass, or other suitable equivalent material which will not emit sparks or a sufficient degree of heat when impinged upon by the action of "picker" machinery to ignite the cotton or other fibrous matter, whereas in the aforesaid patents it was contemplated that the anchor remaining in the bale might be of steel or iron, which steel or iron is found, or is said to be found, liable to cause combustion by being brought into contact with said picker machinery.

My invention further consists in forming the connecting-link between the tag and the anchor in the bale to which the tag is secured integral with the tag itself, by which construction the weakness of the joining of the tag and link is avoided, and liability of loss of the tag is lessened. There is of course a joining left at the anchor, but strain or pull upon the tag is not all received by this joining, because the material of the bale closes upon and clasps the link when formed broad and as a continuation of the tag, and thus strain upon the tag is distributed, instead of being all received by the joining to the anchor. This part of my invention may be modified by making the elongation of the tag enter the bale to a considerable depth, or nearly as far as the anchoring device, though such anchor be not directly attached to such elongation, the main purpose of the invention being obtained—namely, the abandonment of the eyelet or other connection between the tag and anchoring-wire outside of the bale, and such disposition of the tag as shall allow it to be drawn more or less into and be supported by the material of the bale.

My invention further consists in constructing the tag made with the elongation for entering the bale of material which shall be capable of being repeatedly bent, crumpled, and twisted without breakage or tear of the tag, said material to possess at the same time such degree of rigidity and strength as shall enable it to retain letters, figures, and marks embossed upon it by dies for the purposes usually affected by printing or marking. For this purpose I prefer to use very thin sheet metal, preferably of brass or some other alloy of metal, not liable to emit sparks by contact with other substances foreign to the fibrous material to which the tag is to be applied.

An anchoring-tag constructed in accordance with my invention is shown in elevation in Figure 1 and in edge view in Fig. 2.

*a* denotes the tag, having or to have stamped or embossed upon it the identifying letters or characters; *b*, the shank or elongation of the tag, and *c* the anchor by which the tag is secured to the bale.

In the construction of the tag I generally cut or stamp out the part forming the shank *b* of greater width than it is to have when finished, and then double over and bend down the sides, as indicated by dotted lines in Fig. 1. The cord or wire *d*, which fastens the anchor to the shank, will then pass through the three thicknesses of the shank, the whole imparting increased strength and security to the connection between the tag and anchor.

In previous constructions and applications of tags it has been customary to connect the tag to the anchor by a wire, such wire passing through an eyelet or hole in the tag, and thence into the bale and through the anchor. One of such methods is illustrated in Fig. 3. Such constructions and applications are objectionable, however, for the following reasons:

In all labels or tags fastened to goods by cords or wire passing through eyelets it is found that, although strain upon the wire or cord cannot cut through the eyelet, the strain upon the eyelet itself soon causes its edges to tear away from the tag, and the tag becomes lost, though the eyelet remains upon the wire. Moreover, bales of cotton (upon which this invention is principally used) possess very varying degrees of density or compression when the tag is applied, and when the cotton is loosely packed, no matter how hard or to what depth the anchor is driven into the bale, there is constant liability of the connecting-wire being projected from the bale and ruptured or the tag torn off while the bale is being moved. On account of this same loose packing of the cotton the hold of the hook or anchor is lessened, and the tag may thereby be drawn partially away from the bale. Now, by the use of my present invention these difficulties are overcome, because by making the tag of material which can be bent or crumpled, and then elongating it, as described, it is the tag itself which enters more or less into the bale, having no fastening or connection outside of the bale, and being protected from extraction or withdrawal from the bale not only by the anchor, but by the impingement of the fibrous material against the shank b of the tag, while the projecting tag cannot in itself be injured, on account of its pliability.

I am aware that it is not new to wash or cover the iron or steel anchor employed for cotton-marks and the connecting-wire and metallic tag with anti-corrosive metal, but in the employment of such anchors, whether so rendered incorrosive or not, there is the same or about the same liability to produce ignition of the cotton when a hook accidentally left in the bale might be brought into contact with the picking machinery, as before described, as percussion with the machinery would almost inevitably penetrate through the non-corrosive metal.

In the construction of an anchor which shall not possess any such liability I prefer to use a non-metallic material, such as horn, rubber, or wood, possessing or made to possess the proper degree of strength and stiffness, though brass and similar metal may be employed for the purpose.

I claim—

1. Constructing a flexible anchoring-tag with a shank or elongation for entering the bale integral with or forming part of the tag, substantially as set forth.

2. Constructing the tag (when so made) of material possessing sufficient rigidity and strength to enable it to properly retain embossed letters or other characters, while also possessing pliability and tenacity such as will admit of its being crimpled or bent without breakage or injury.

3. Constructing the hook or anchor of material which is incapable of emitting or producing sparks by contact with machinery or foreign substances, as set forth.

EDWARD A. LOCKE.

Witnesses:
 FRANCIS GOULD,
 HENRY W. GOODRICH.